United States Patent [19]
Simmons

[11] Patent Number: 5,974,451
[45] Date of Patent: Oct. 26, 1999

[54] SYSTEM AND METHOD FOR DISTRIBUTING BULLETINS TO EXTERNAL COMPUTERS ACCESSING WIDE AREA COMPUTER NETWORKS

[75] Inventor: C. Thomas Simmons, Berlin, Germany

[73] Assignee: Novaville AG, Germany

[21] Appl. No.: 08/866,265

[22] Filed: May 30, 1997

Related U.S. Application Data

[60] Provisional application No. 60/027,677, Oct. 7, 1996.

[51] Int. Cl.$^6$ ..................................................... G06F 17/60
[52] U.S. Cl. .............................. 709/218; 707/501; 705/14
[58] Field of Search .................... 395/200.36, 200.33, 395/200.47, 200.48, 200.49; 705/26, 10, 14, 27; 707/10, 501, 513; 709/217, 218, 219, 204, 208

[56] References Cited

U.S. PATENT DOCUMENTS

| | | | |
|---|---|---|---|
| 5,105,184 | 4/1992 | Pirani et al. | 340/721 |
| 5,305,195 | 4/1994 | Murphy | 364/401 |
| 5,347,632 | 9/1994 | Filepp et al. | 395/200 |
| 5,515,098 | 5/1996 | Carles | 348/8 |
| 5,572,643 | 11/1996 | Judson | 395/793 |
| 5,740,549 | 4/1998 | Reilly et al. | 705/14 |

OTHER PUBLICATIONS

Interactive Hyper Net USA, Inc., World Wide Web Site, http://www.hyperusa.net/arch.htm, Jan. 25, 1997.

"Internet access: Internet marketing revolution begins in the U.S. this Sep.; Hyper System promises new cash flow for providers, free access for users, & a new marketing opportunity for businesses," EDGE: Work–Group Computing Report, vol. 7, No. 316, p. 2, Jun. 3, 1996.

Booker, Ellis "Seeing a Gap, A Palo Alto Startup Will Debut Advertising Server for the Net", Web Week, v.2 iss2. Available online at http://www.interntworld.com, Feb. 1996.

Metcalfe, Bob "From the Ether", InfoWorld, v. 18 iss 3. Available at http://www.infoworld.com, Aug. 1996.

NetGravity AdServer 2.0 Announcement. Available at http://www.netgravity.com, Oct. 1996.

Kohda et al. "Ubiquitous advertising on the WWW: Merging advertisement on the browser", Computer Networks and ISDN Systems, v.28 No. 11, pp. 1493–1499, May 1996.

*Primary Examiner*—Dung C. Dinh
*Attorney, Agent, or Firm*—Fish & Neave; Jeffrey H. Ingerman; Matthew T. Byrne

[57] ABSTRACT

A network access system is provided for distributing bulletins, such as advertisements, to external computers accessing a wide area computer network. The network access system of the present invention connects the external computers to the wide area computer network, and sends bulletins with information being transmitted from remote information servers within the wide area computer network to the external computers. A bulletin server within the network access system stores a plurality of bulletins to be transmitted to the external computers, determines whether to send a bulletin with the information being transmitted, determines what bulletins to transmit to the external computers, and sends the bulletins with the information being transmitted from the remote information servers to the external computers. Upon receipt of a bulletin, the external computers may display the bulletins as part of the received information, may display the bulletins before allowing the user to view the received information, or may display the bulletins as part of a separate window.

9 Claims, 7 Drawing Sheets

SYSTEM AND METHOD FOR DISTRIBUTING BULLETINS TO EXTERNAL COMPUTERS ACCESSING WIDE AREA COMPUTER NETWORKS

CROSS REFERENCE TO RELATED APPLICATION

This claims the benefit of U.S. Provisional Application No. 60/027,677, filed Oct. 7, 1996.

BACKGROUND OF THE INVENTION

This invention relates to network access systems. Network access systems are widely used to connect external computers to wide area computer networks, such as the Internet, through dedicated interfaces and dial-up connections. More particularly, this invention relates to network access systems which, in addition to connecting external computers to wide area computer networks, distribute bulletins, such as advertisements, to the external computers.

In recent years, wide area computer networks such as the Internet have experienced an explosion in popularity. Not surprisingly, with this popularity, there has been a concentrated effort by businesses to use these networks to promote business and improve revenues. One example of where this effort can be clearly seen is the posting of advertisements by businesses in newsgroups and in World Wide Web pages.

In known systems, these advertisements are broadcast to external computers by individual remote information servers located throughout a wide area computer network. When an external computer connects to a remote information server and accesses a newsgroup or Web page comprising an advertisement, the advertisement is broadcast from the remote information server through the network and the network access system to the external computer. In many instances, these remote information servers will broadcast the same information and advertisements to external computers regardless of the geographic location of the network access systems through which the external computers are gaining access to the network. For example, an external computer accessing a World Wide Web site in New Jersey through a network access system in New York will receive an identical advertisement to that received by an external computer accessing the same site through a network access system in Australia.

In an effort to optimally target the users of external computers with the most suitable bulletins, some remote information servers have been configured to determine the identity of each user accessing the servers, monitor the information retrieved by the users, and develop a profile for those users. In some instances, these remote information servers independently maintain the profiles for each user, and in other instances, the remote information servers jointly maintain the profiles for each user to obtain a higher degree of accuracy in the profiles. In this way, these servers can categorize the interests of the users and, therefore, send the users the most appropriate bulletins. For example, a user who has been identified in the past as repeatedly accessing information on travel—and, therefore, a user for whom a profile has been developed which indicates that the user likes to travel—would likely be targeted with bulletins relating to vacation destinations or airfare specials.

One way these servers identify users is through the Internet Protocol (IP) addresses of the users' computers. Primarily, IP addresses are used in wide area computer networks to direct messages between different devices attached to the network. For example, when a remote information server sends information to a user's computer, the remote information server attaches the IP address of the user's computer to the information in order to direct the information through the network from the remote information server to the user's computer—much like placing a label on an envelope and mailing it from the remote information server to the user's computer. In cases where a computer's IP address is always the same and only one person uses the computer, an IP address can be an effective way to identify a user accessing a remote information server.

Another way these remote information servers identify users is through log-in information requested from the users when the users attempt to access information on the servers. For example, the first time a user accesses a remote information server, the user may be prompted for a log-in name, a password, an address, a telephone number, an occupation, an age, a gender, etc. During subsequent attempts to access information on the remote information server, the user may be required to re-enter the log-in name and password. Once this information has been entered, the user is permitted to access information on the server. Using the log-in information, the remote information server can then identify the user to create a user profile. Furthermore, this log-in information can also be used to contribute to the user's profile in addition to identifying the user. As long as the information entered by each user in response to the log-in prompts is accurate and consistent, log-in information can also be an effective way to identify and target external computer users.

Sending an advertisement from a remote information server in a wide area computer network, however, may be inefficient or ineffective in at least five respects. First, the advertisement only reaches its intended audience if members of that audience access the remote information server on which the advertisement is stored.

Second, the advertiser must continually identify and advertise on the servers containing the most popular newsgroups and Web pages of the targeted audience to keep up with their interests.

Third, remote information servers have a limited ability to accurately identify the users accessing the remote information servers because many known network access systems dynamically allocate different IP addresses to the same external computers and because many users give inconsistent, or even false, responses to log-in information requests.

Fourth, advertising on remote information servers that serve all of the users of a wide area computer network forces advertisers to advertise at the global level of the wide area computer network rather than at a local or regional level within that network.

Fifth, because advertising revenues are not being received by the providers of access to the network, advertisers are unable to offset the costs to the users associated with accessing the wide area computer network and thereby increase the number of users viewing their advertisements as is done in other advertising media such as television, radio, and newspaper.

In view of the foregoing, it would be desirable to provide a network access system that can effectively deliver bulletins to users of external computers while connecting them to wide area computer networks.

It would be also desirable to provide a network access system which can deliver bulletins to all users of the network access system regardless of the particular remote information servers which they access.

It would be further desirable to provide a network access system that can accurately identify the user of an external computer and, therefore, optimally match available advertising to the user's likes and dislikes.

It would be even further desirable to provide a network access system that allows advertisers to advertise at a local or regional level within a wide area computer network rather than requiring the advertisers to advertise at the global level of the network.

It would be still further desirable to provide a network access system that allows advertisers to offset the costs associated with accessing wide area computer networks, and thereby increase the number of users viewing their advertisements, as is done in other advertising media such as television, radio, and newspaper.

SUMMARY OF THE INVENTION

It is therefore an object of the invention to provide a network access system that can effectively deliver bulletins to users of external computers while connecting them to wide area computer networks.

It is another object of the invention to provide a network access system which can deliver bulletins to all users of the network access system regardless of the particular remote information servers which they access.

It is still another object of the invention to provide a network access system that can accurately identify the user of an external computer and, therefore, optimally match available advertising to the user's likes and dislikes.

It is a further object of the invention to provide a network access system that allows advertisers to advertise at a local or regional level within a wide area computer network rather than requiring the advertisers to advertise at the global level of the network.

It is a still further object of the invention to provide a network access system that allows advertisers to offset the costs associated with accessing wide area computer networks, and thereby increase the number of users viewing their advertisements, as is done in other advertising media such as television, radio, and newspaper.

These and other objects of the invention are accomplished in accordance with the principles of the invention by providing a network access system which distributes bulletins to external computers while connecting the external computers to a wide area computer network.

The bulletin distribution capability of the network access system of the present invention is provided by a bulletin server incorporated into the network access system. The bulletin server distributes bulletins by sending bulletins with information being relayed by the network access system to one or more external computers. More particularly, when information is received at the network access system from a remote information server, the bulletin server first determines whether a bulletin is to be sent with the received information. If so, the bulletin server then selects an appropriate bulletin to send with the received information. Once a bulletin has been selected, the network access system then sends the attached bulletin and information on to the user's external computer. Bulletins may be sent with the received information by attaching the bulletins to the information and sending the bulletins and information together, or by sending the bulletins and information separately, for example. If, however, it is determined that a bulletin is not to be sent with the received information, then the received information is forwarded to the external computer unaccompanied by a bulletin.

In this way, the network access system of the present invention overcomes the aforementioned, as well as other, problems associated with the known technique of broadcasting bulletins from remote information servers. First, by distributing bulletins from network access systems, advertisers can always distribute bulletins to users regardless of which remote information servers the users choose to connect to. Second, also for the reason that advertising is being distributed from the network access system rather than the remote information servers, advertisers do not have to determine which remote information servers contain the most popular newsgroups or World Wide Web pages to insure exposure to the targeted audience. Third, the network access system can always identify the users of the network access system with absolute certainty since the users are required to provide verifiable log-in information when initially accessing the network access system. Fourth, advertisers can restrict the distribution of bulletins to only those external computers within the geographical region surrounding the network access system. Fifth, advertisers, by paying advertising fees to the network access system provider, enable the users of external computers to receive free or discounted access to wide area computer networks similar to that realized in other advertising media such as television, radio, and newspaper.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which.

DETAILED DESCRIPTION OF THE INVENTION

Figure 1:
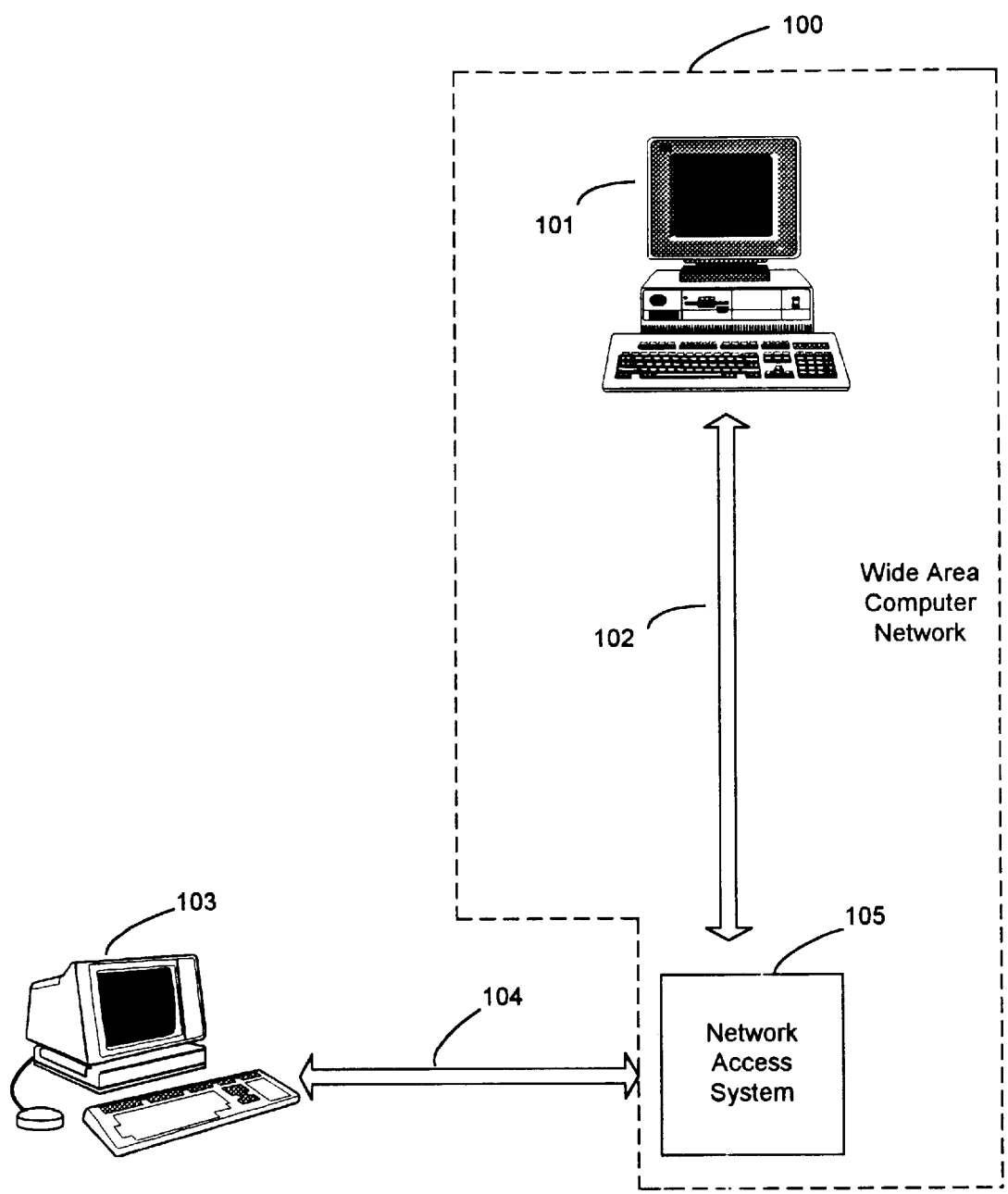
FIG. 1 is a block diagram illustrating one embodiment of an architecture for connecting an external computer 103 to a wide area computer network 100 through a network access system 105 of the present invention.

The present invention provides a method and apparatus for distributing bulletins to external computers from network access systems connected to wide area computer networks. Known network access systems are used to connect external computers to wide area computer networks. These network access systems enable the external computers to communicate with remote information servers connected to the wide area computer networks by relaying messages between the external computers and the remote information servers. The present invention adds a bulletin delivery function to known network access systems. The bulletin delivery function operates by sending bulletins along with information being relayed by the network access systems from the remote information servers to the external computers. In addition to delivering bulletins with information being relayed by the network access systems, in preferred embodiments of the present invention, the network access systems also determine whether bulletins are to be delivered and which bulletins are to be delivered to the external computers.

In one embodiment of the present invention, the bulletin delivery function is implemented by a bulletin server incorporated into a network access system. The bulletin server operates by monitoring information being relayed to external computers, by determining whether a bulletin is to be sent with each piece of information being relayed, and, when required, by selecting a bulletin to be sent with, and by attaching (if necessary) the selected bulletin to, the piece of information being relayed by the network access system. Once the bulletin server has determined that no bulletin is to be sent with the piece of information being relayed by the network access system, or the bulletin server has selected and attached (if necessary) a bulletin to the piece of information being relayed by the network access system, the network access system then delivers the information and the bulletin (if to be sent) from the remote information server to the external computer.

The bulletin server monitors information being relayed by the network access system to the external computer to determine the content, format, and destination of each piece of information passing through the network access system. The bulletin server may then use this content, format, and destination data, as well as other data stored in the bulletin server (e.g., user's address, age, gender, occupation, race, income, ethnicity, national origin, religion, education level, personal interests, etc., or users' profile data), to determine whether a bulletin is to be sent with any of the pieces of information. For example, the bulletin server may be configured to send bulletins with pieces of information destined for a first set of users and not send bulletins with pieces of information destined for a second set of users. In such a configuration, only those pieces of information destined for the first set of users would be determined as being accompanied by a bulletin.

When the bulletin server determines that no bulletin is to be sent with a piece of information passing through the network access system, the information is passed to the external computer without addition. If, however, the bulletin server determines that a bulletin is to be sent with a piece of information passing through the network access system, the bulletin server then selects a bulletin to be sent. Once again, the bulletin server looks at data such as the content, format, and destination of the piece of information and other data stored in the bulletin server (e.g., user's address, age, gender, occupation, race, income, ethnicity, national origin, religion, education level, personal interests, etc., or user's profile data) to determine which bulletin to select. For example, when a piece of information is destined for a particular user whose profile reveals that the user likes sports, sports related bulletins may be selected to be delivered to the user.

Once a bulletin has been selected to be delivered with a piece of information, the bulletin server may then attach the bulletin to the information in some embodiments of the present invention. Any number of approaches can be used to attach the bulletin to the information being delivered to the external computer. For example, bulletin attachment could involve locating a clear region in an original information display and positioning a graphical bulletin in that region. As another example, bulletin attachment could involve appending a text bulletin to the end of an information file, or positioning the text bulletin at the beginning of the information file. Positioning the text bulletin at the beginning of the information file may be preferable because the user is more certain to see the bulletin. On the other hand, users may object to the bulletin, and any advertising it may contain, if they cannot choose whether or not to look at the bulletin, in which case it may be preferable to position the bulletin at the end of the information file.

In other embodiments of the present invention, a bulletin may be sent as separate data along with a piece of information passing through the network access system rather than attaching the bulletin directly to the information. for example, where information is being sent as a bitmap or text file, a bulletin could be sent as an additional bitmap, text, or other type of file.

Finally, once the bulletin server has selected and attached (if necessary) a bulletin to the requested information, the bulletin and information are delivered to the external computer. Upon receipt of the bulletin and information by the external computer, the external computer may display each of the bulletin and the information as part of the same image or as separate images. For example, the bulletin and the information could be displayed as part of the same image by displaying the information as a World Wide Web page and displaying the bulletin within a reserved space within that page, assuming that a clear area exists within the image. As another example, the bulletin and the information may be displayed as part of separate images by first displaying the bulletin, and then displaying the requested information after the user has responded to the displayed bulletin or a predetermined time period has passed. Such an approach could be implemented as a set of World Wide Web pages wherein a bulletin page is first displayed which shows the selected bulletin, and then an information page is shown after the user has activated a Hyper-Text link within the bulletin page. As still another example, the bulletin and the information may be displayed as part of separate images by first displaying the requested information, and then displaying the bulletin after the user has responded to the displayed information or a predetermined time period has passed. Such an approach could be implemented as a set of World Wide Web pages wherein an information page is first displayed which shows the requested information, and then a bulletin page is shown after the user has activated a Hyper-Text link within the information page. As yet another example, the bulletin and the information may be displayed as part of separate images by displaying the bulletin and the requested information in separate windows within the same display or in different displays. In such implementations, activating a Hyper-Text link in the bulletin display (where the bulletin supports Hyper-Text link), could cause the information display to display more information about the bulletin.

These displays of the bulletins and information could be presented through the execution of World Wide Web browsers (such as Netscape Navigator available from Netscape Communications Corporation and Internet Explorer available from Microsoft Corporation), through the execution of other types of communications software, through the execution of other types of non-communications software, or through dedicated hardware in the external computers. For example, a word processor could incorporate a display algorithm which allows it to display bulletins and information received while communicating with a network access system.

The present invention can be further described with reference to FIGS. 1–4.

FIG. 1 illustrates one embodiment of an architecture, of the type in which the present invention can be used, for connecting an external computer 103 to a wide area computer network 100 through a network access system 105. As shown, external computer 103 is connected to network access system 105 through a communication link 104, and network access system 105 is connected to a remote information server 101 through a network link 102. In this arrangement, external computer 103 can communicate with remote information server 101 through communication link 104, network access system 105, and network link 102.

In this architecture, a number of different types of devices can be used to implement each of external computer 103, communications link 104, network link 102, and remote information server 101. External computer 103 may be implemented by any device capable of communicating with a wide area computer network. For example, external computer 103 may be a desktop computer, a mainframe computer, a Unix workstation, a network router, or a network gateway. Communication link 104 may be implemented by any means of providing an interface between external computer 103 and network access system 105. For example, communication link 104 may be a dial-up connection, a dedicated network connection, a single network, a combination of networks, a cable modem, or a two-way wireless communication link. Similarly, network link 102 may be implemented by any means of providing an interface between network access system 105 and remote information server 101. For example, network link 102 may be a dedicated interface, a single network, a combination of networks, a cable modem, or a two-way wireless communication link. Remote information server 101 may be implemented by any type of storage capable of providing information to external computer 103 upon request. For example, remote information server 101 may be a dedicated network server, a desktop computer, a mainframe computer, or a Unix workstation.

Figure 2:
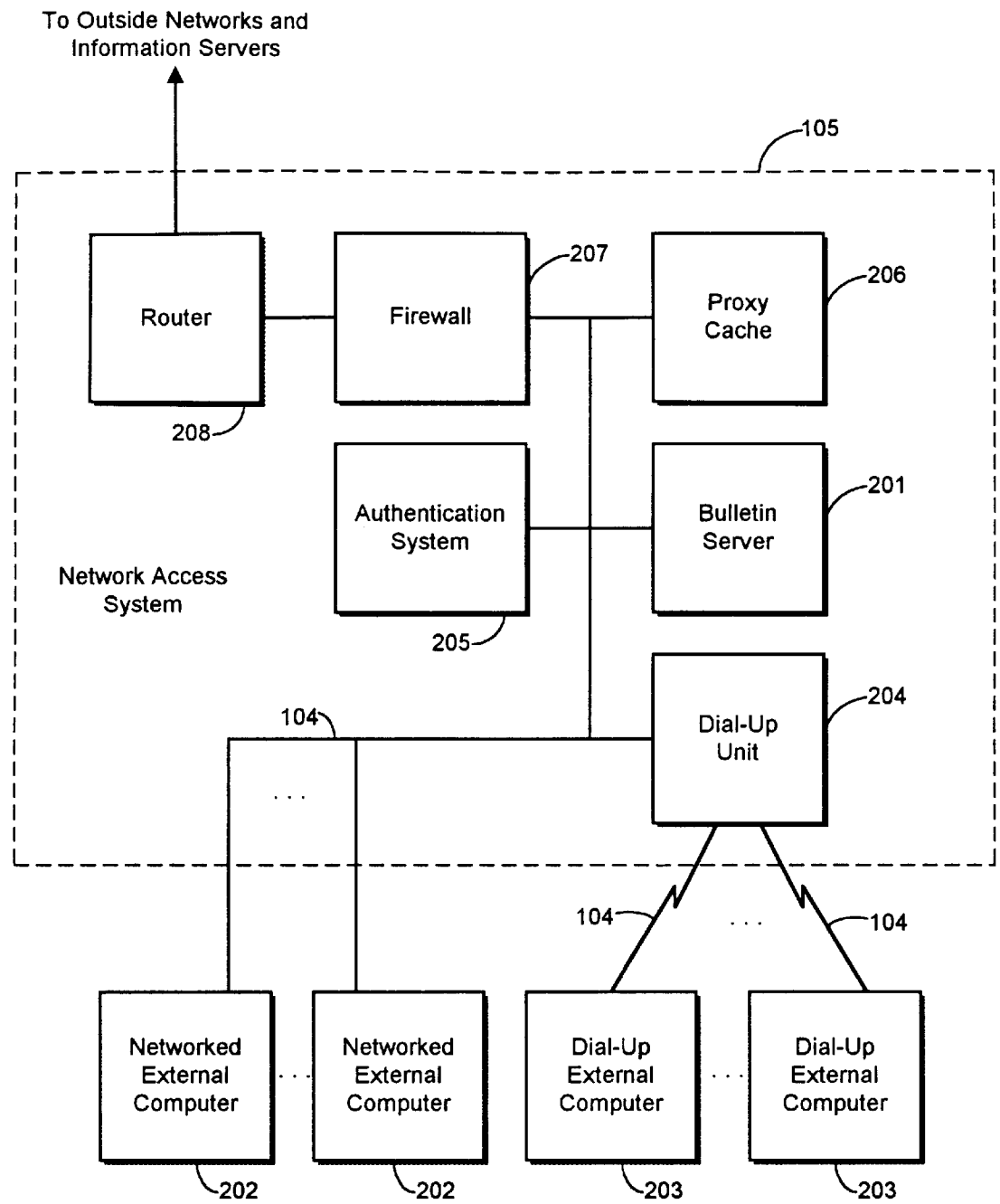
FIG. 2 is a block diagram illustrating the subsystems within the network access system of one embodiment of the present invention.

In the architecture of FIG. 1, network access system 105 is preferably a network access system implemented in accordance with the present invention. One embodiment of such a network access system is shown in FIG. 2. As illustrated, network access system 105 comprises a dial-up unit 204, an authentication system 205, a bulletin server 201, a proxy cache 206, a firewall 207, and a router 208. Dial-up unit 204 communicates with any portion of communication link 104 that comprises a dial-up connection between network access system 105 and one or more dial-up external computers 203. Dial-up unit 204 may include encryption, decryption, call-back, error checking, and data compression functions. Dial-up external computers 203 comprise external computers 103 (FIG. 1) which access the network access system through a dial-up connection. Additionally or alternatively, external computers 103 may also be connected to network access system 105 in the form of one or more networked external computers 202. Networked external computers 202 differ from dial-up external computers 203 in the regard that the networked computers connect directly to authentication system 205, bulletin server 201, proxy cache 206, and firewall 207 without having to connect through dial-up unit 204.

Access control in the network access system of the present invention is provided by authentication system 205. Authentication system 205 verifies that all users accessing the network access system 105 are authorized to do so. Authentication system 205 may include log-in prompting, encryption, decryption, and digital signature authentication functions.

Information distribution is controlled by the proxy cache in the preferred embodiments of the present invention. Proxy cache 206 provides local storage for frequently used information that would otherwise be retrieved by requesting the information from a remote information server. By providing local storage for frequently used information, proxy cache 206 avoids the need for redundant retrieval of the information from the wide area computer network and, thereby, quickens the apparent response time of the wide area computer network to the user. When information is requested by the user via an external computer 202 or 203, the network access system first determines whether a copy of the information is stored in proxy cache 206. If the information is present, the network access system relays the stored information to the user from the proxy cache. Otherwise, a request is sent to a remote information server on the wide area computer network, and the information is retrieved. A copy of the retrieved information is then stored in proxy cache 206 for future use.

Bulletin server 201 of the present invention provides control of the distribution of bulletins such as advertisements to external computers 202 or 203 connected to network access system 105. Bulletin server 201 may provide storage for a plurality of bulletins to be broadcast to the external computers. This storage may be implemented by any number of types of storage devices such as a computer disk drive, a tape drive, memory circuits, etc. Bulletin server 201 may also provide selection logic to determine whether or not to distribute bulletins and to determine which bulletins to distribute at any given time. This selection logic may be implemented through dedicated hardware or through software executing in general purpose hardware. Bulletin server 201 may further provide a user database from which the selection logic can retrieve information on the users accessing the network access system. This database may be implemented in any manner capable of reliably storing information regarding at least one characteristic of at least one user. Further, the database information may be stored in the same storage device in which the bulletins are stored or may alternatively be stored in a separate storage device. Bulletin server 201 may still further provide attachment logic for attaching bulletins to information being relayed by the network access system. Like the selection logic, the attachment logic may be implemented through dedicated hardware or through software executing in general purpose hardware.

Security and routing functions are provided by firewall 207 and router 208 in the preferred embodiments of the present invention. Firewall 207 prevents unauthorized access to network access system 105—and external computers 202 and 203 connected to the network access system —by network users attempting to gain access from the wide area computer network. Firewall 207 may also be configured to prevent external computer users from accessing unauthorized sites on the wide area computer network. Router 208 provides routing control of network traffic between network access system 105 and wide area computer network 100. For example, router 208 routes, in the most efficient direction, information requests from within the network access system to the remote information servers containing the requested information.

Figure 3:
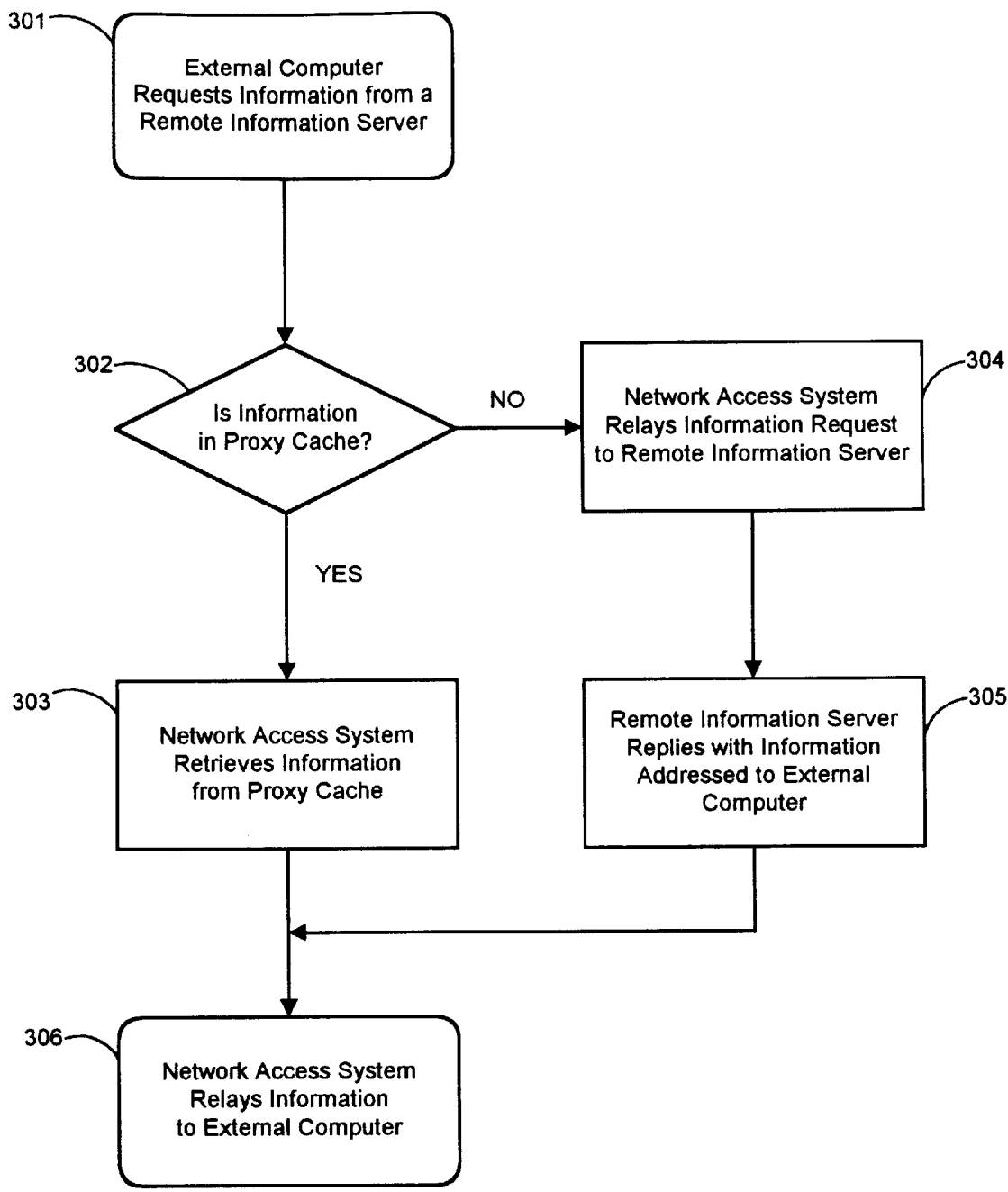
FIG. 3 is a flow chart illustrating a prior art method for accessing information from a remote information server and relaying that information to an external computer.

FIG. 3 illustrates an example of how information is retrieved by an external computer connected to a wide area computer network through known network access systems. As shown in block 301, the retrieval of information begins by the external computer requesting information from a remote information server connected to the wide area computer network. The network access system then determines whether the requested document is stored in the proxy cache, as illustrated at test 302. If at test 302 the requested information is not stored in the proxy cache, the network access system relays the request for information to the remote information server (block 304), and the remote information server responds to this request by replying with the requested information addressed to the external computer (block 305). If at test 302 it is determined that the requested information is stored in the proxy cache, the network access system retrieves the requested information from the proxy cache, as shown at block 303. Once the information is in the network access system, the network access system relays the requested information to the external computer as illustrated in block 306.

Figure 4:
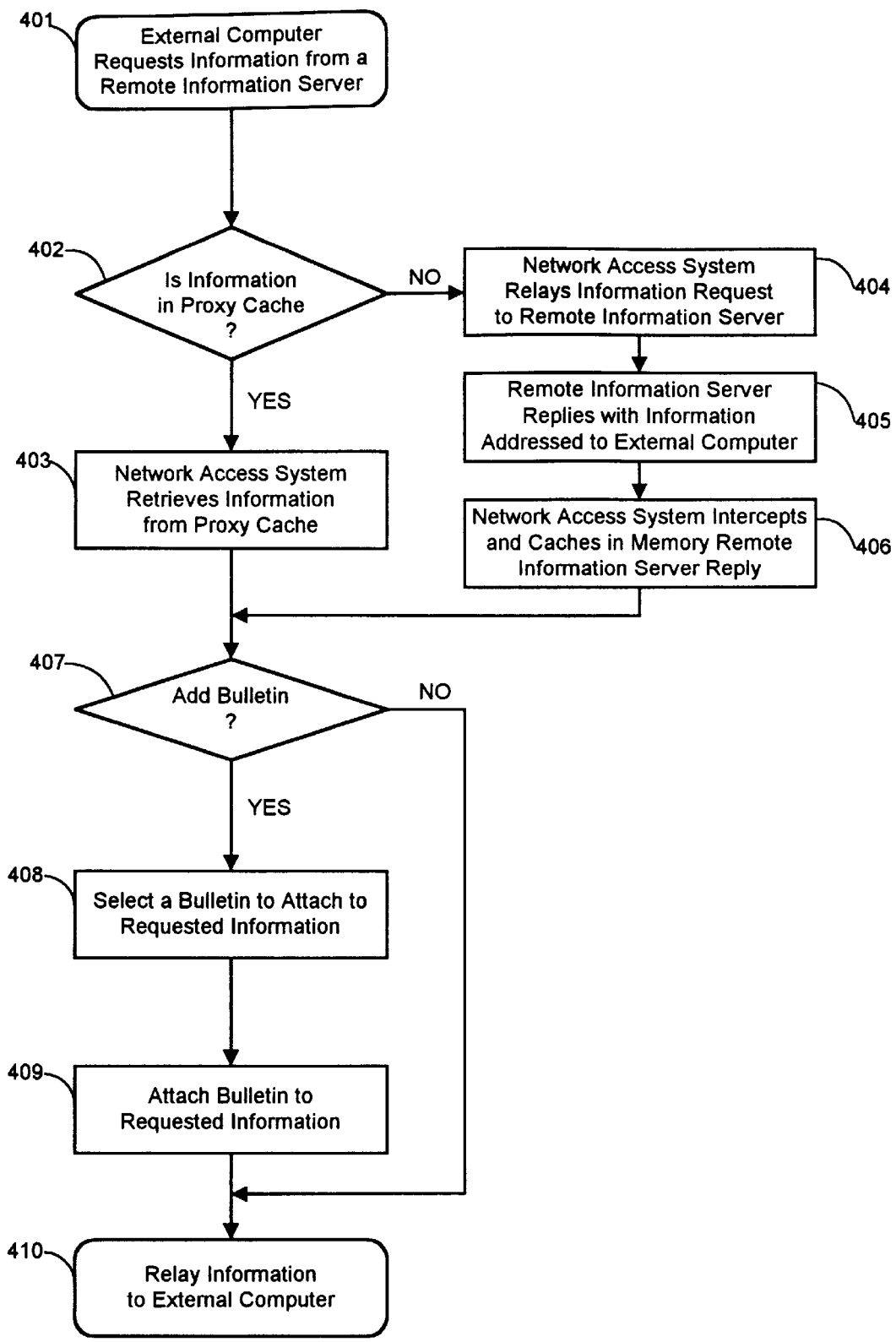
FIG. 4 is a flow chart illustrating one embodiment of a method of the present invention for merging bulletins with information being retrieved from a remote information server.

As illustrated in one embodiment of the present invention shown in FIG. 4, the present invention adds the distribution of bulletins to this process of retrieving requested information. Similarly to block 301 and test 302 (FIG. 3), block 401 and test 402 show that the process begins by an external computer requesting information from a remote information server and the network access system determining whether the requested information is in its proxy cache. If it is determined at test 402 that the information is in the proxy cache, the network access system retrieves the information from the proxy cache and stores it in the bulletin server's memory (block 403). If, however, it is determined at test 402 that the information is not in the proxy cache, the network access system relays the information request to the remote information server and the server replies with the requested information addressed to the external computer (blocks 404 and 405). Upon receiving the reply from the remote information server, the network access system intercepts and caches the reply in the bulletin server's memory (block 406).

Once the requested information is in the bulletin server's memory, the bulletin server then determines whether it is going to add a bulletin to the information requested at test 407. The determination of whether a bulletin is going to be attached to the requested information at test 407 may be based upon such factors as the content, format, or destination of the requested information, data known about the user receiving the requested information such as the user's address, age, gender, occupation, race, income, ethnicity, national origin, religion, education level, personal interests, etc., or predetermined factors such as the time since the last bulletin was attached or the number of times information has been relayed since the last bulletin was attached. For example, a bulletin could be attached to Web pages being relayed to the user's external computer every five minutes or every tenth page.

If at test 407 the bulletin server determines that it is not going to add a bulletin to the requested information, then the information is relayed to the external computer unmodified (block 410). Otherwise, a bulletin to be attached to the requested information is selected, the selected bulletin is attached to the requested information, and the attached bulletin and information are relayed to the external computer (blocks 408, 409, and 410).

Like determining whether a bulletin is going to be attached to requested information, bulletin selection in block 408 may be based upon such factors as the content, format, or destination of the requested information, data known about the user receiving the requested information such as the user's address, age, gender, occupation, race, income, ethnicity, national origin, religion, education level, personal interests, etc., or may be based upon a sequential selection of bulletins comprising one or more bulletin lists. For example, a bulletin relating to software development tools could be selected based upon the user's occupation as a computer programmer. As another example, bulletins from a list of local bulletins could be sequentially sent to each user living in a particular set of zip codes.

Attachment of the bulletins to the requested information may be implemented in any of a number of approaches depending upon the form of the requested information. For example, with requested information being relayed in Hyper-Text Markup Language format, a bulletin could be attached to the requested information by creating a Hyper-Text link from the bulletin to the requested information, and by packaging the bulletin and the requested information so that the bulletin is displayed first and then the requested information is displayed after the user of the external computer activates the Hyper-Text link. Alternatively, the bulletins could be attached to the requested information by combining bitmaps of the bulletin and information, or by placing a text bulletin at the beginning or end of text information, as described above.

Although FIG. 4 illustrates an embodiment of the present invention in which bulletins are attached to information being relayed to external computers, the present invention could also be implemented by sending bulletins separately from the information being relayed. For example, in FIG. 4: test 407, rather than determining whether to add a bulletin, would determine whether a bulletin should be sent in addition to the requested information; block 408 would select a bulletin to be sent along with the requested information rather than a bulletin to be attached to the requested information; block 409 would send the selected bulletin; and block 410 would send the requested information.

Figure 5A:
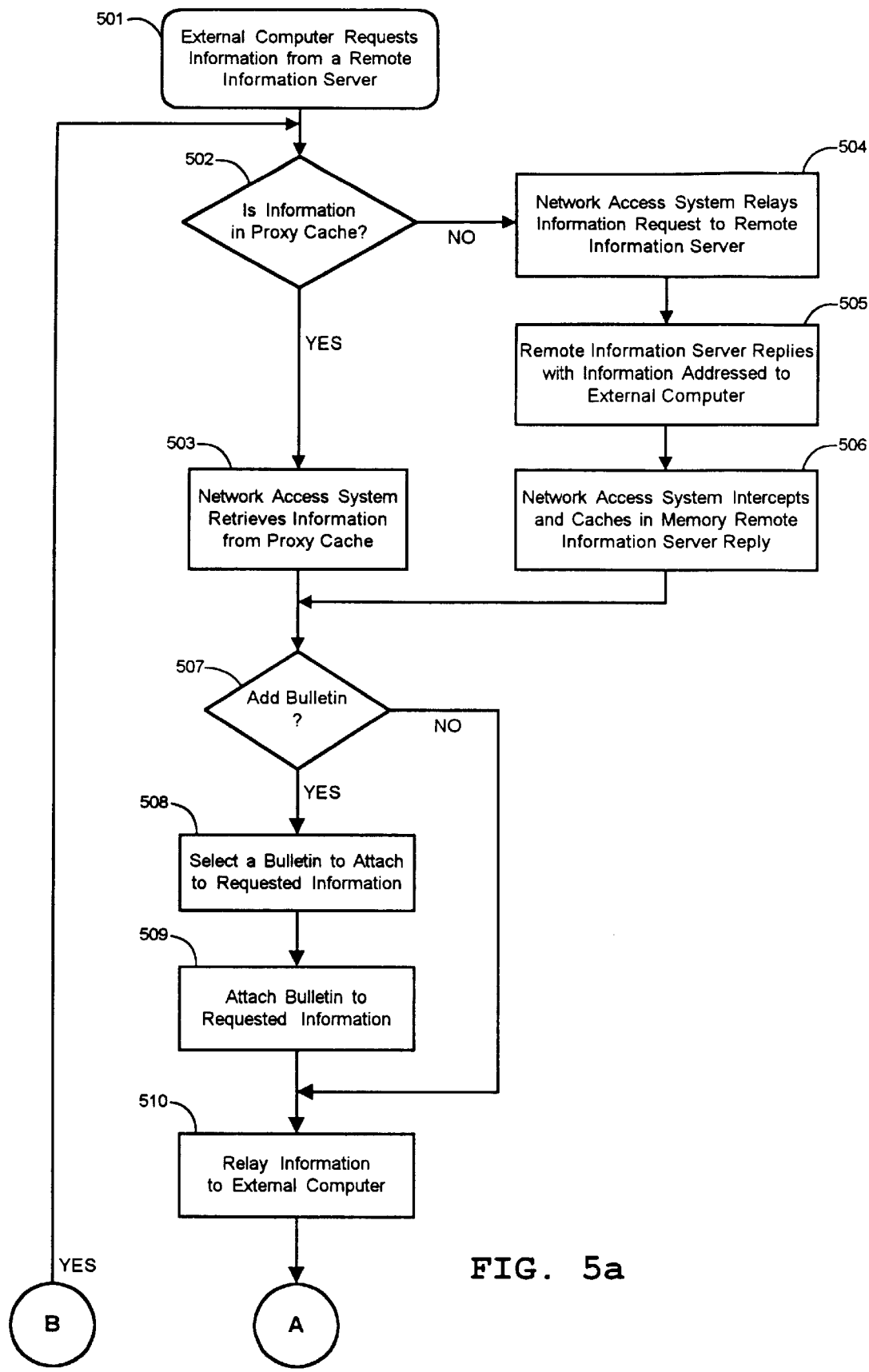
FIGS. 5a and 5b are a flow chart illustrating one embodiment of a method of the present invention for sending bulletins to external computers independently of or in addition to information being relayed by the network access system.
Figure 5B:
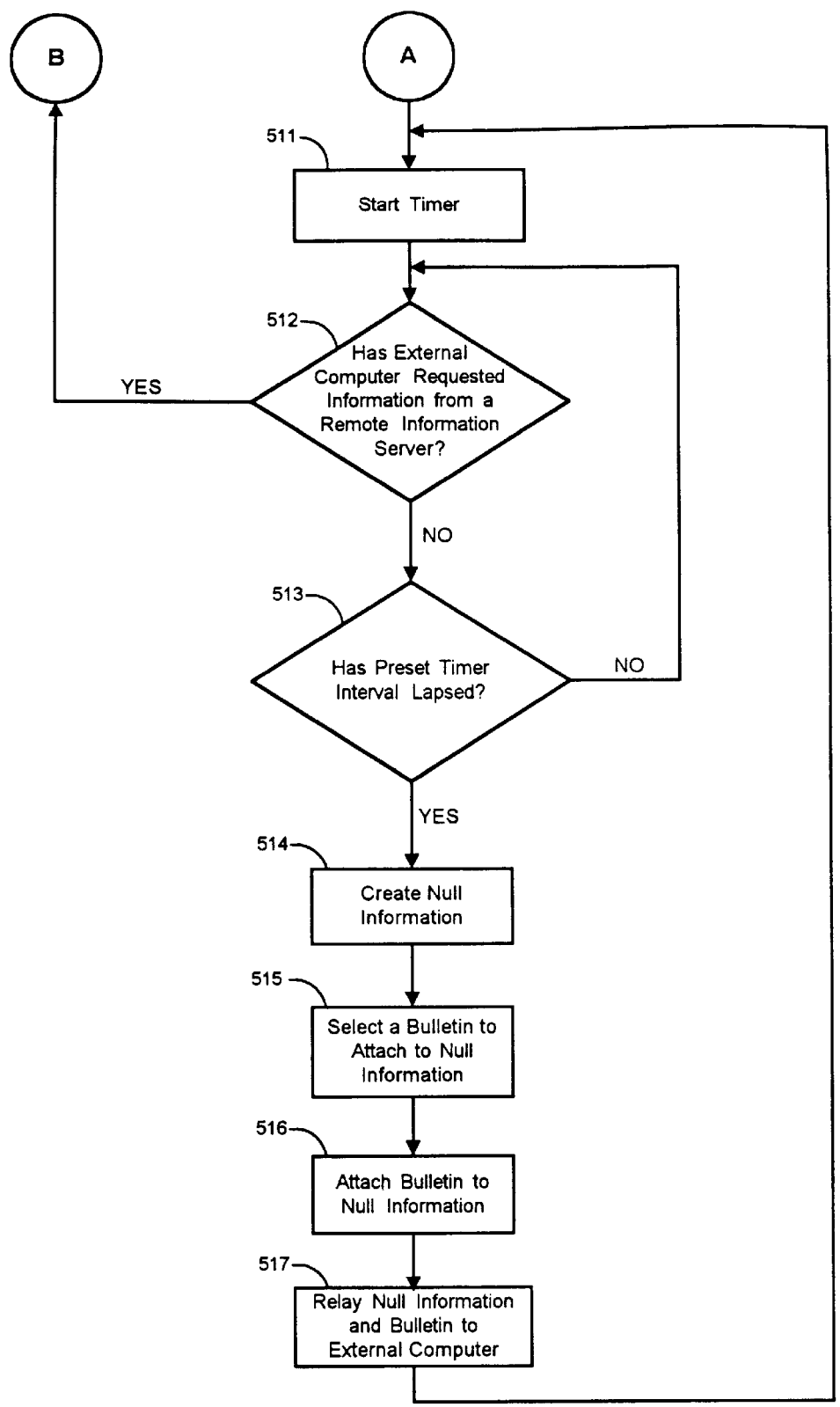

FIGS. 5*a* and 5*b* illustrate an embodiment of a method of the present invention in which bulletins may be sent to an external computer based upon the passing of a time interval in addition to being sent with requested information. As shown, blocks 501, 503–506, and 508–510, and tests 502 and 507 perform identical functions to those provided by blocks 401, 403–406, and 408–410, and tests 402 and 407 as described in connection with FIG. 4. Upon the relaying of information and possibly a bulletin at block 510, under this method a timer is started at block 511. This timer determines the amount of time that passes between consecutive information relays from the network access system to an external computer. At test 512, the bulletin server determines whether the external computer has requested information from a remote information server. If a request has been issued, the method returns to block 502 to handle the request. If no information has been requested by the external computer at test 512, the bulletin server determines whether the timer has exceeded a given time interval at test 513. If it is determined at test 513 that the timer has not exceeded the given time interval, the bulletin server loops back to test 512 to check once again to see if the external computer has requested information from a remote information server. If it is determined at test 513 that the timer has exceeded the given time interval, the bulletin server creates a null information packet to be transmitted to the external computer at block 514. This packet is created to maintain communication protocol with the external computer and may be omitted where the communication protocol between the network access system and the external computer does not require it. At block 515, the bulletin server selects a bulletin to be sent to the external computer. Once a bulletin has been selected, the bulletin server then attaches the selected bulletin to the null information (when present) and relays the null information and bulletin to the external computer at blocks 516 and 517.

Figure 6:
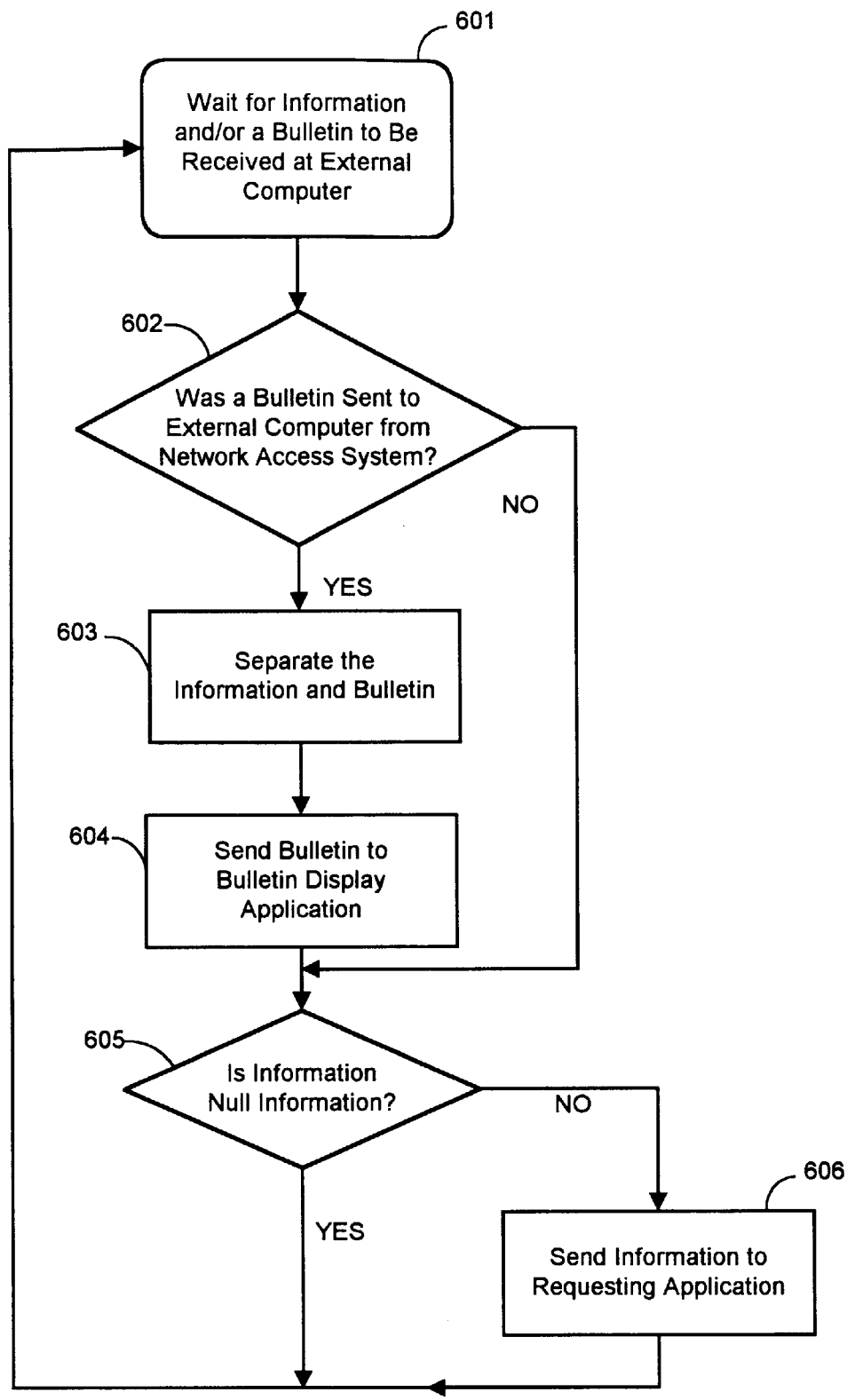
FIG. 6 is a flow chart illustrating one embodiment of a method of the present invention for receiving, separating, and handling bulletins and requested information at external computers.

FIG. 6 illustrates an embodiment of a method of the present invention for receiving, separating, and handling, at an external computer, relayed information and bulletins that were sent by a network access system of the present invention. This method begins with the external computer waiting for information and/or bulletins to be received at the external computer at block 601. The external computer may receive relayed information only, relayed information and attached bulletins, null information and attached bulletins, or bulletins only (in embodiments of the invention where bulletins can be sent without attached information). Once information and/or bulletins are received at the external computer, the external computer determines whether a bulletin was received from the network access system at test 602. If it is determined that a bulletin was received from the network access system, the bulletin and information, if any, are separated at block 603. Once the bulletin has been isolated from any received information, the bulletin is sent to a bulletin display application for display at block 604. After the bulletin has been sent to the bulletin display application at block 604, or it is determined at test 602 that a bulletin was not received from the network access system, the external computer determines at test 605 whether the information received at the external computer is null information. If the information is null information, the external computer loops back to block 601 to wait for more information and/or bulletins to be received from the network access system. Otherwise, if the information is not determined to be null information at test 605, the information is sent at block 606 to the application that requested the information. Once the information has been sent to the requesting application at block 606, the external computer loops back to block 601 to wait form more information and/or bulletins to be received from the network access system.

It will be understood that the foregoing is only illustrative of the principles of the invention and that various modifications can be made by those skilled in the art without departing from the scope and spirit of the invention, which is limited only by the claims that follow.

What is claimed is:

1. A network access system for relaying information between a wide area computer network and an external computer, and for distributing at least one bulletin to said external computer, said network access system comprising:

a first interface that couples said network access system to said wide area computer network and that receives said information from said wide area computer network;

a second interface that couples said network access system to said external computer and that transmits said information and said at least one bulletin to said external computer;

a local storage device that stores said at least one bulletin; and a bulletin server that, in response to said first interface receiving said information from said wide area computer network, retrieves said at least one bulletin from said local storage device and transmits said at least one bulletin with said information being received by said first interface and transmitted by said second interface.

2. The network access system of claim 1, wherein said network access system further comprises a proxy cache, said first interface receiving said information from said proxy cache rather than from said wide area computer network.

3. The network access system of claim 1, wherein said bulletin server comprises said local storage device for storing said at least one bulletin.

4. The network access system of claim 1, wherein said bulletin server comprises selection logic which determines whether any of said at least one bulletin should be transmitted with said information.

5. A bulletin server for attaching at least one bulletin to information being relayed from a wide area computer network to an external computer, said bulletin server comprising:

storage that stores said at least one bulletin; and attachment logic that, in response to said bulletin server receiving said information from said wide area computer network, retrieves said at least one bulletin from said storage and attaches said at least one bulletin to said information.

6. The bulletin server of claim 5, further comprising selection logic for determining whether to attach any of said at least one bulletin to said information.

7. A method for distributing at least one bulletin to an external computer from a network access system, said method comprising:

receiving information addressed to said external computer from a wide area computer network at said network access system;

retrieving, at said network access system, said at least one bulletin from a local storage device within said network access system in response to said information being received from said wide area computer network;

attaching said at least one bulletin retrieved from said local storage device to said received information to form an attached bulletin and information at said network access system; and relaying said attached bulletin and information to said external computer from said network access system.

8. The method of claim 7 further comprising:

determining, at said network access system, whether any of said at least one bulletin is to be attached to said information; and relaying, from said network access system, said information to said external computer and skipping said attaching and said relaying of said attached bulletin and information when said determining determines that none of said at least one bulletin is to be attached to said information.

9. The method of claim 7 wherein said receiving of information comprises receiving said information from a proxy cache when a copy of said information is stored in said proxy cache rather than receiving said information from said wide area computer network.

* * * * *